(12) United States Patent
Lin

(10) Patent No.: US 7,533,446 B1
(45) Date of Patent: May 19, 2009

(54) VARIABLE RESISTANCE HINGE

(75) Inventor: Tzu-Yu Lin, Shulin (TW)

(73) Assignee: Shin Zu Shing Co., Ltd., Taipei (TW)

( * ) Notice: Subject to any disclaimer, the term of this patent is extended or adjusted under 35 U.S.C. 154(b) by 0 days.

(21) Appl. No.: 11/985,536

(22) Filed: Nov. 15, 2007

(51) Int. Cl.
*E05D 11/10* (2006.01)

(52) U.S. Cl. .............................. 16/330; 16/303; 16/340

(58) Field of Classification Search .................. 16/330, 16/338–342, 303, 374; 361/680–682; 248/919–923
See application file for complete search history.

(56) References Cited

U.S. PATENT DOCUMENTS

| | | | | |
|---|---|---|---|---|
| 5,970,819 | A * | 10/1999 | Katoh | 74/531 |
| 6,154,925 | A * | 12/2000 | Miura | 16/338 |
| 6,757,940 | B2 * | 7/2004 | Lu et al. | 16/330 |
| 6,862,779 | B1 * | 3/2005 | Lu et al. | 16/340 |
| 7,082,642 | B2 * | 8/2006 | Su | 16/340 |
| 7,222,396 | B2 * | 5/2007 | Lu et al. | 16/340 |
| 7,251,129 | B2 * | 7/2007 | Lee et al. | 361/683 |
| 2006/0185126 | A1 * | 8/2006 | Su | 16/340 |
| 2007/0136992 | A1 * | 6/2007 | Lu et al. | 16/330 |

* cited by examiner

*Primary Examiner*—William L. Miller
(74) *Attorney, Agent, or Firm*—Jackson Walker, LLP

(57) ABSTRACT

A variable resistance hinge is mounted in a notebook computer having cover and a base and the hinge has a stationary leaf, a pivoting leaf and a pressing assembly. The stationary leaf is attached to the base and has a keyed shaft. The pivoting leaf is mounted pivotally on the shaft and is attached to the cover. The pressing assembly is mounted around the shaft, presses the pivoting leaf against the stationary leaf and has a pivoting ring and a stationary ring. The pivoting ring rotates around the shaft, is attached to the pivoting leaf and has at least one stepped detent. The stationary ring engages the shaft, abuts the pivoting ring and has at least one friction protrusion. Each friction protrusion corresponds a stepped detent and provides variable friction when opening the cover to enhance lifespan of the hinge and facilitate opening of the notebook.

5 Claims, 9 Drawing Sheets

VARIABLE RESISTANCE HINGE

BACKGROUND OF THE INVENTION

1. Field of the Invention

The present invention relates to a hinge, and more particularly to a variable resistance hinge mounting a cover pivotally to a base of a notebook computer.

2. Description of the Prior Arts

A conventional hinge is mounted between a cover having a display and a base of a notebook computer to allow the cover to pivot relative to the base, but is often designed with a constant resistance throughout an entire pivoting movement so that the cover can be pivoted open to any desired angle. However, if the resistance of the conventional hinge is too great, people opening the notebook computer may struggle to open up the cover, or the base may lift with the cover. If the resistance is too low, people have to hold the cover to prevent the cover from rapidly falling and damaging the base or display and the cover cannot be held at a desired angle. Therefore, the conventional hinge with constant resistance makes opening difficult and may not be reliable at holding the cover open.

To overcome the shortcomings, the present invention provides a variable resistance hinge to mitigate or obviate the aforementioned problems.

SUMMARY OF THE INVENTION

The primary objective of the present invention is to provide a variable resistance hinge being mounted in a notebook computer to provide a variable resistance during opening of a cover for a notebook computer.

The variable resistance hinge is mounted in the notebook computer between the cover having a display and a base and comprises a stationary leaf, a pivoting leaf and a pressing assembly. The stationary leaf is attached to the base and has a keyed shaft. The pivoting leaf is mounted pivotally on the shaft and is attached to the cover. The pressing assembly is mounted around the shaft, presses the pivoting leaf against the stationary leaf and has a pivoting ring and a stationary ring. The pivoting ring rotates around the shaft, is attached to the pivoting leaf and has at least one stepped detent. The stationary ring engages the shaft, abuts the pivoting ring and has at least one friction protrusion. Each friction protrusion corresponds to a stepped detent and provides variable friction when opening the cover to enhance lifespan of the hinge and facilitate opening of the notebook.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
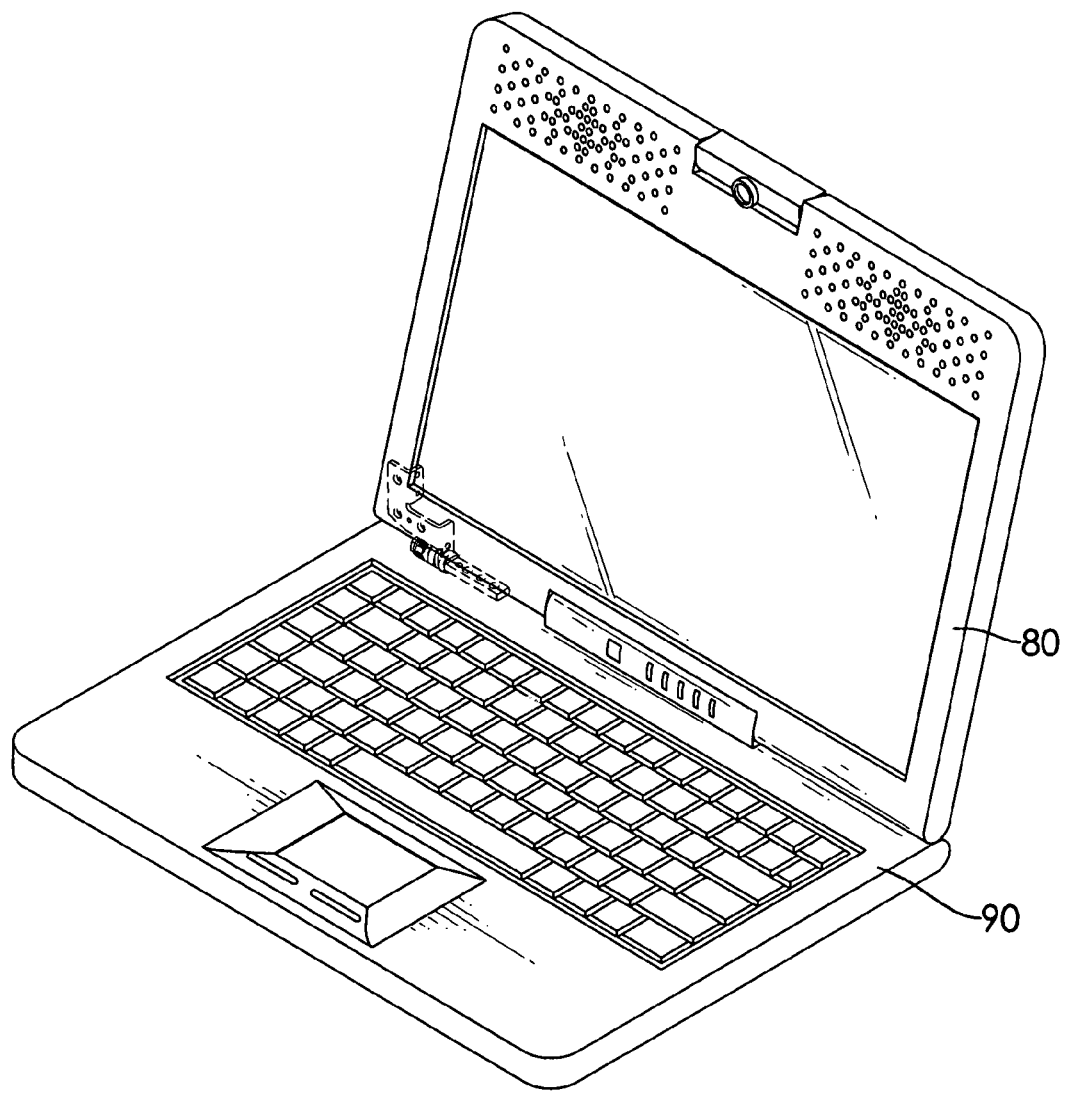
FIG. 1 is a perspective view of a variable resistance hinge in accordance with the present invention mounted in a notebook computer, shown open.
Figure 2:
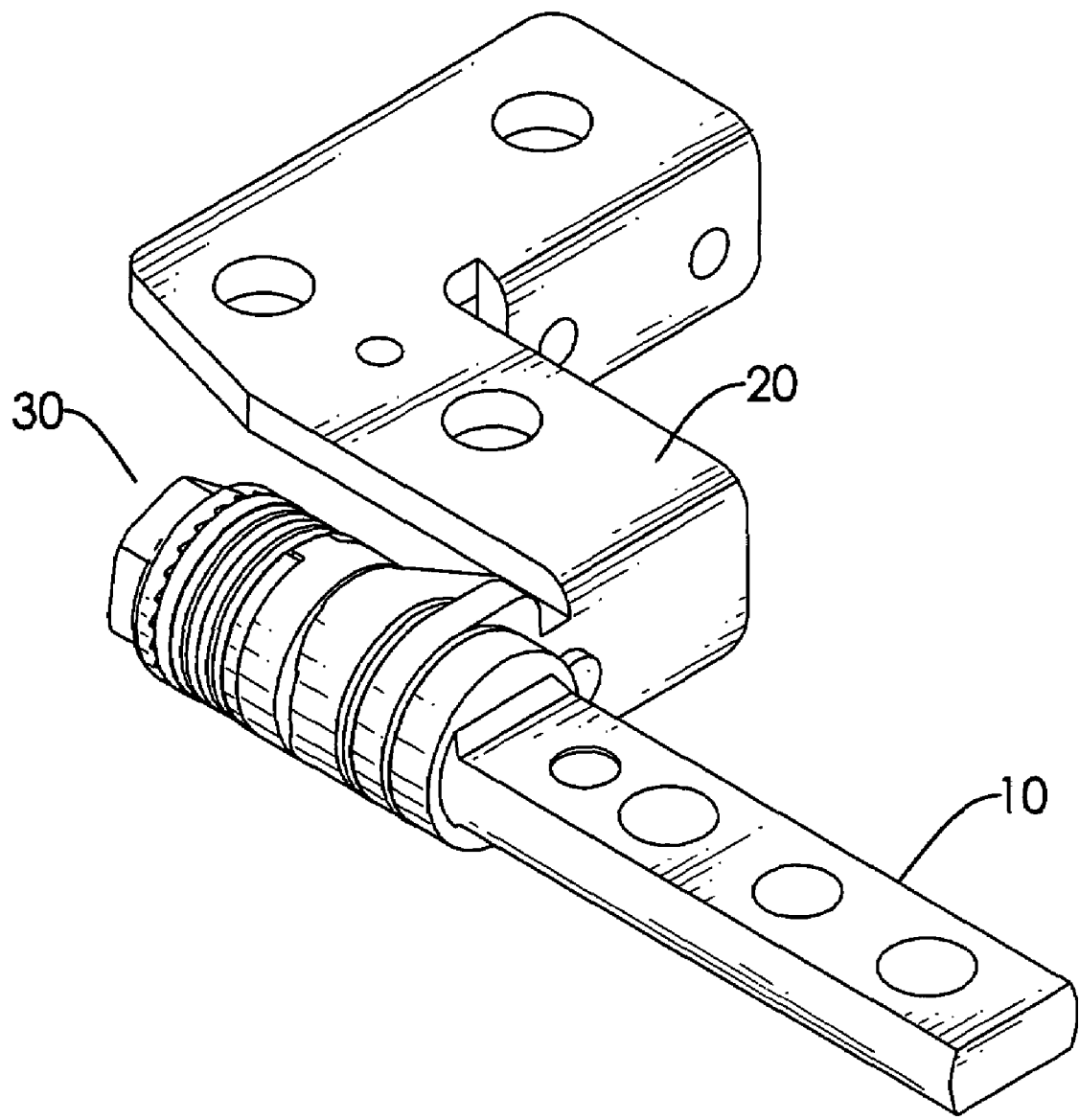
FIG. 2 is an enlarged perspective view of the variable resistance hinge in FIG. 1.
Figure 12:
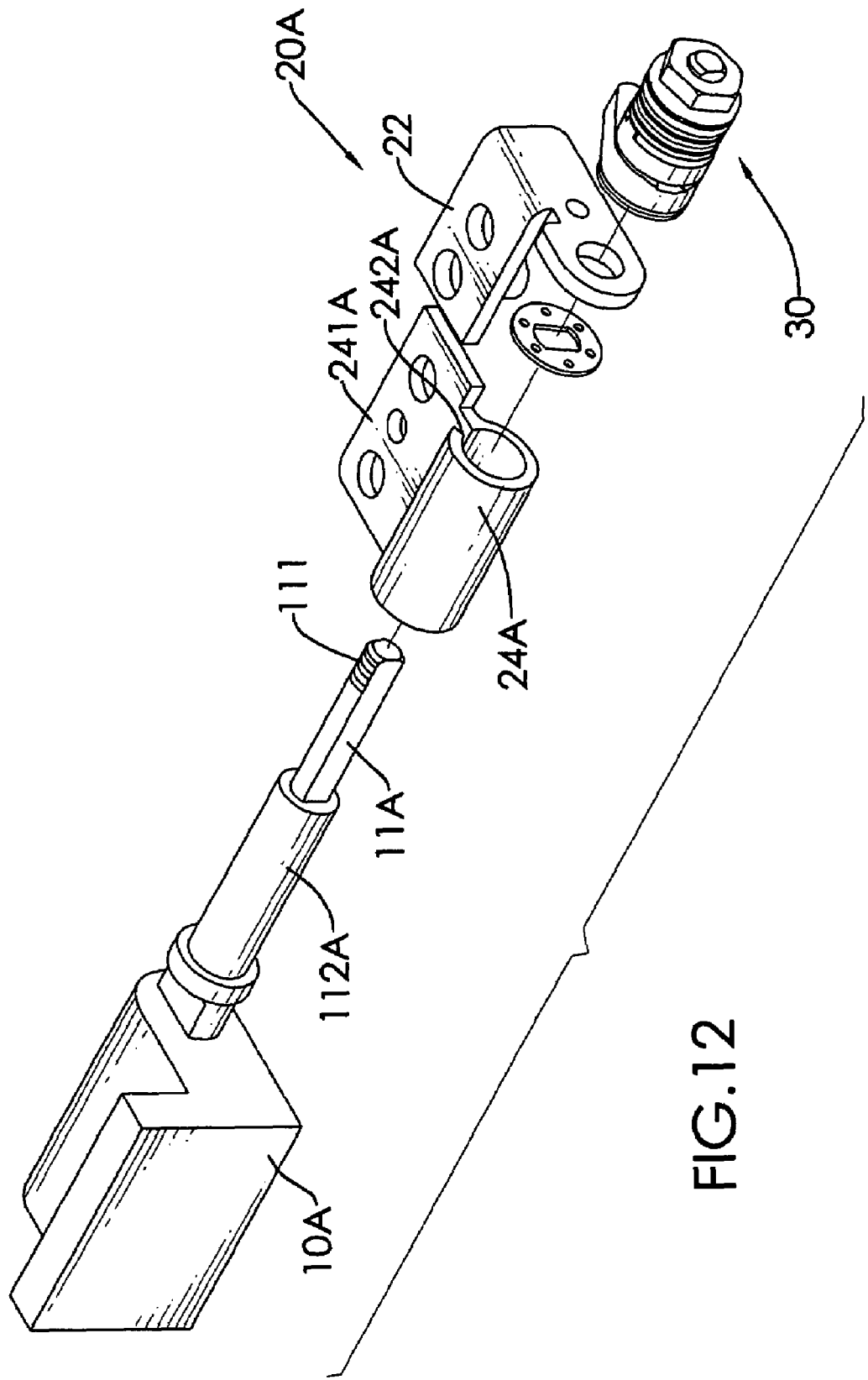
FIG. 12 is a perspective view of a second variant of a variable resistance hinge in accordance with the present invention.

With reference to FIGS. 1, 2 and 12, a variable resistance hinge in accordance with the present invention is mounted in a notebook computer comprising a cover (80) and a base (90) to allow the cover (80) to pivot relative to the base (90). The variable resistance hinge comprises a stationary leaf (10, 10A), a pivoting leaf (20, 20A) and a pressing assembly (30).

Figure 3:
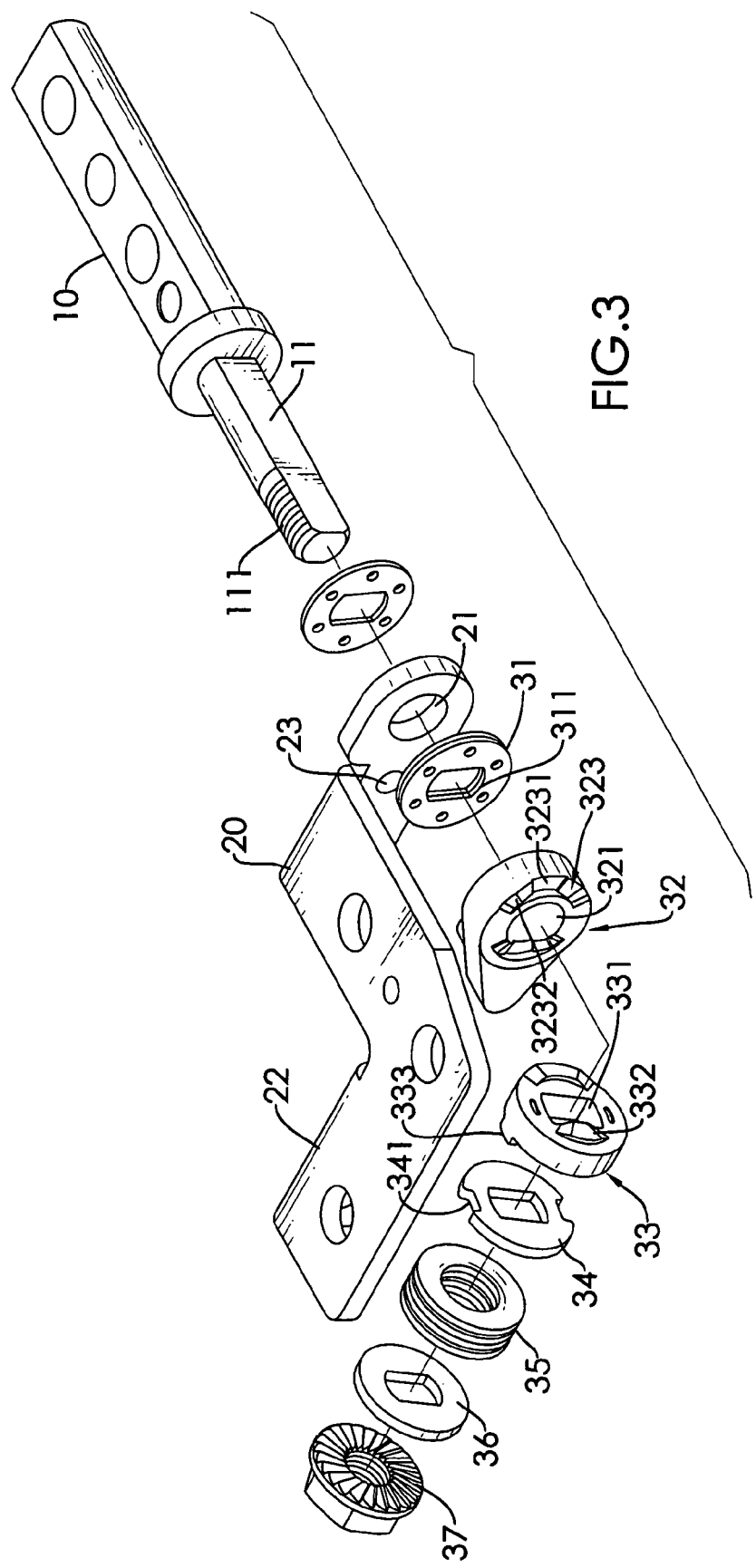
FIG. 3 is an exploded perspective view of the variable resistance hinge in FIG. 2.

With further reference to FIG. 3, the stationary leaf (10, 10A) is attached to the base (90) of the notebook computer and has a proximal end, a distal end, an inner surface and a shaft (11, 11A).

The proximal end of the stationary leaf (10, 10A) is attached securely to the base of the notebook computer.

The inner surface is formed perpendicularly on the distal end of the stationary leaf (10).

The shaft (11, 11A) is formed on and extends coaxially from the distal end of the stationary leaf (10, 10A), is keyed, has a proximal end, a distal end and an optional friction cylinder (112A) and may have a threaded segment (111).

The friction cylinder (112A) is formed concentrically on the proximal end of the shaft (11A).

The threaded segment (111) is formed on the distal end of the shaft (11, 11A).

Figure 4:
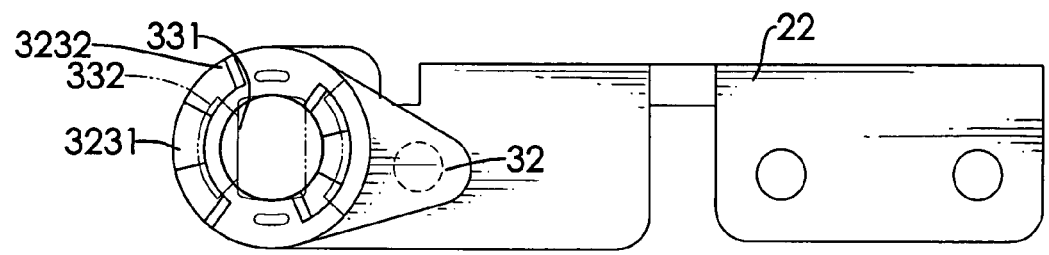
FIG. 4 is a side view of the variable resistance hinge in FIG. 2.
Figure 8:
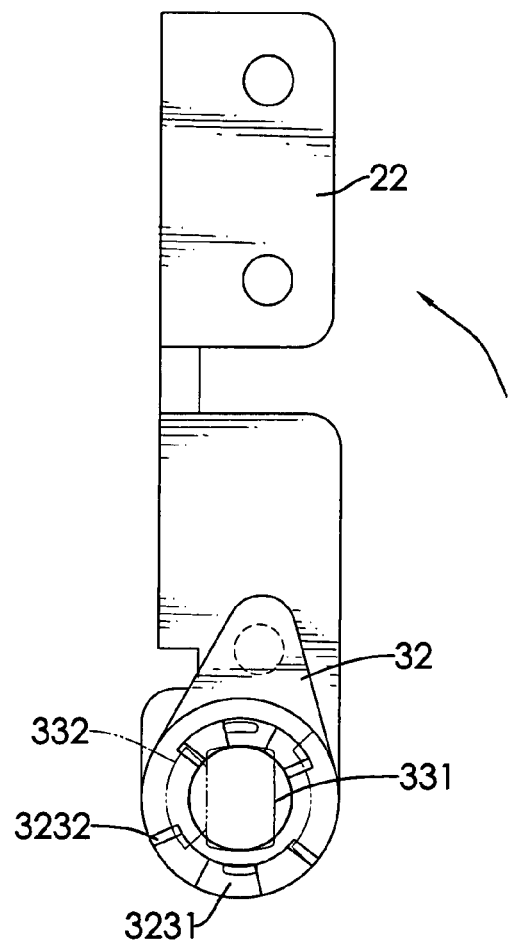
FIG. 8 is an operational side view of the variable resistance hinge in FIG. 2.
Figure 5:
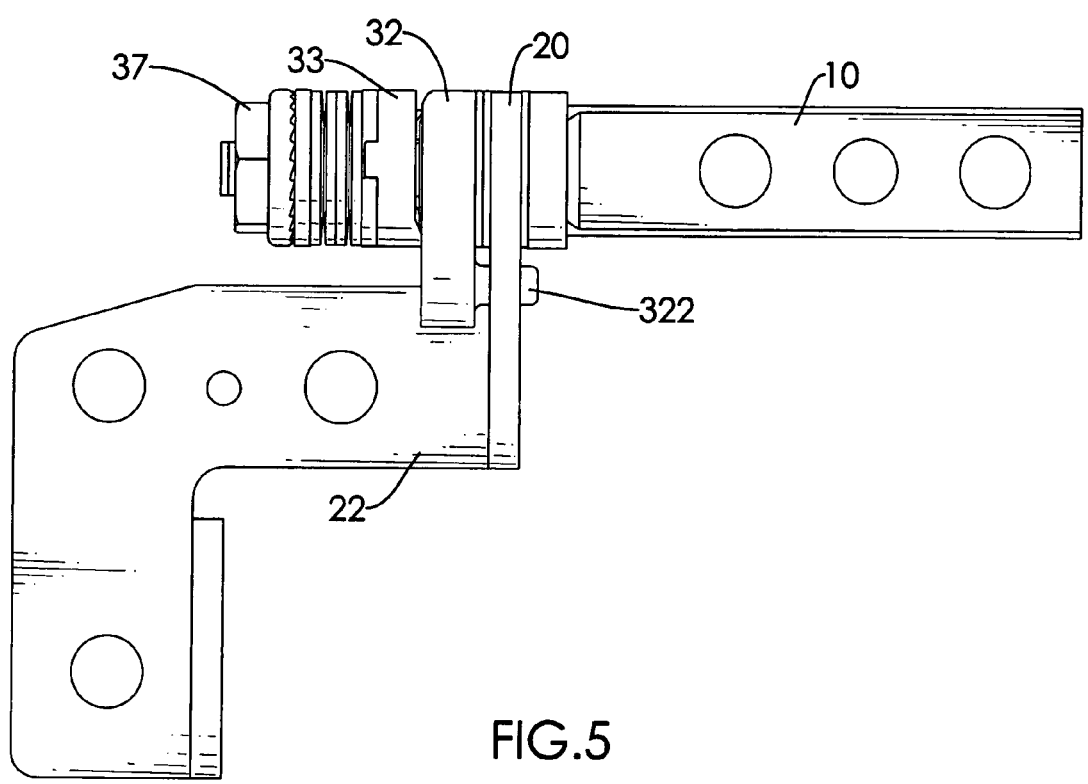
FIG. 5 is a bottom view of the variable resistance hinge in FIG. 2.

With further reference to FIGS. 4 and 5, the pivoting leaf (20, 20A) is mounted rotatably on the shaft (11, 11A), abuts the inner surface of the stationary leaf (10, 10A), is attached securely to the cover (80) of the notebook computer to allow the cover (80) to pivot relative to the base (90), has a pivoting hole (21), a mounting bracket (22) and an optional barrel (24A) and may have a stop mount (23).

The pivoting hole (21) is formed coaxially through the pivoting leaf (20, 20A) and is mounted rotatably around the shaft (11, 11A) of the stationary leaf (10, 10A).

The mounting bracket (22) is formed on and protrudes from the pivoting leaf (20, 20A) and is attached securely to the cover (80).

The barrel (24A) is rotatably mounted tightly around the friction cylinder (112A) to provide a friction for pivoting movement of the pivoting leaf (20A) and has a connecting protrusion (241A), a neck and an opening (242A). The connecting protrusion (241A) is formed on and protrudes from the neck of the barrel (24A) and is attached securely to the mounting bracket (22) of the pivoting leaf (20A). The opening (242A) is formed longitudinally in the barrel (24A) adjacent to the neck and is disposed adjacent to the connecting protrusion (241A) towards a direction of closing the cover (80). Therefore, when a person opens the cover (80), the opening (242A) will be enlarged to provide less friction and facilitate opening and more friction when folding the cover (80) to prevent damage to the cover (80).

The stop mount (23) is formed in the pivoting leaf (20, 20A).

The pressing assembly (30) is mounted around the shaft (11, 11A) near the distal end, presses the pivoting leaf (20) against the inner surface of the stationary leaf (10) to provide friction against rotation relative to the stationary leaf (10), has a pivoting ring (32) and a stationary ring (33) and may have a washer (31), a protecting washer (34), a biasing element (35), a friction washer (36) and a fastener (37).

Figure 6:
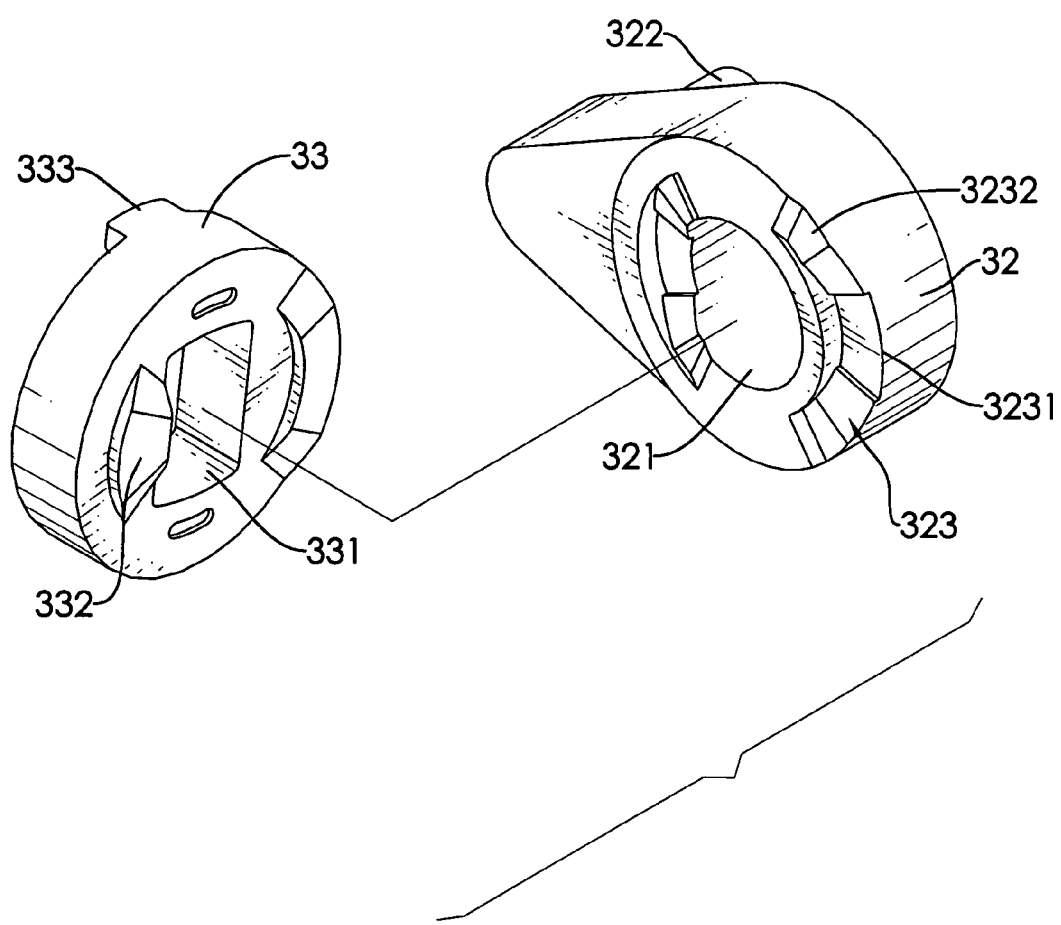
FIG. 6 is an enlarged exploded perspective view of friction elements of the variable resistance hinge in FIG. 2.
Figure 7:
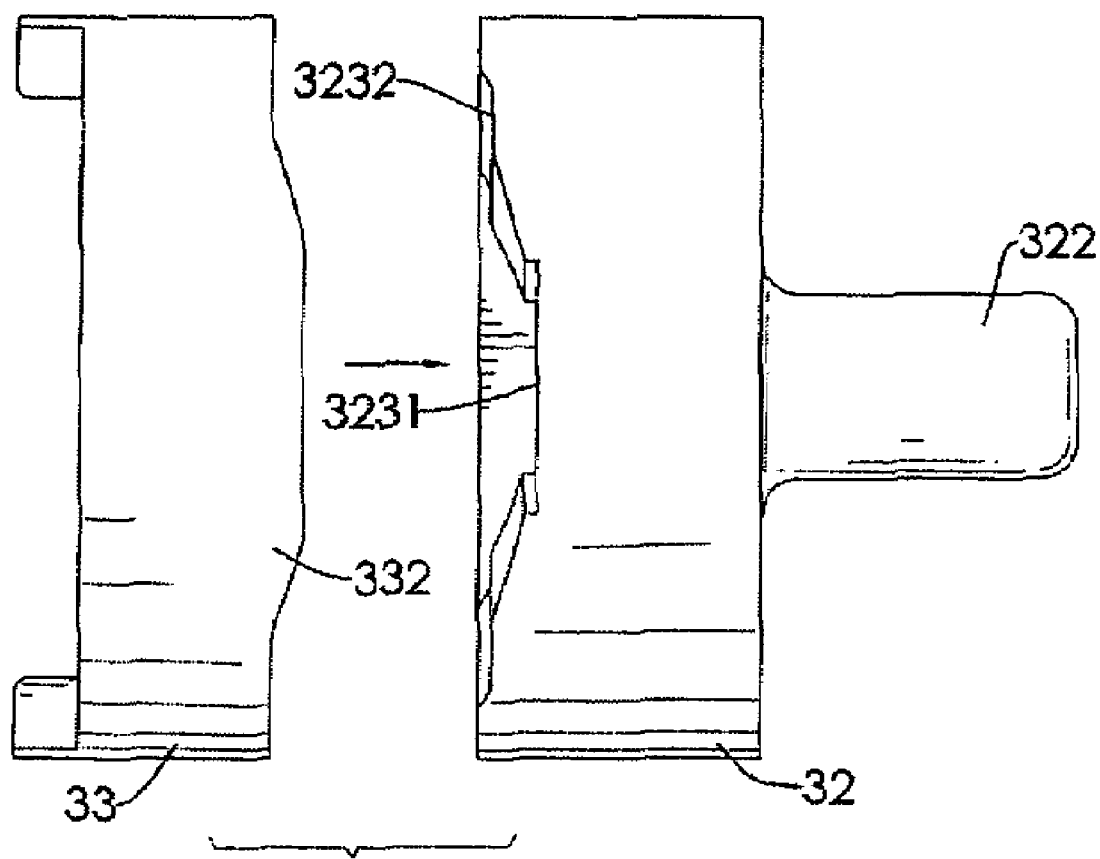
FIG. 7 is an enlarged front view of the friction elements in FIG. 6.
Figure 9:
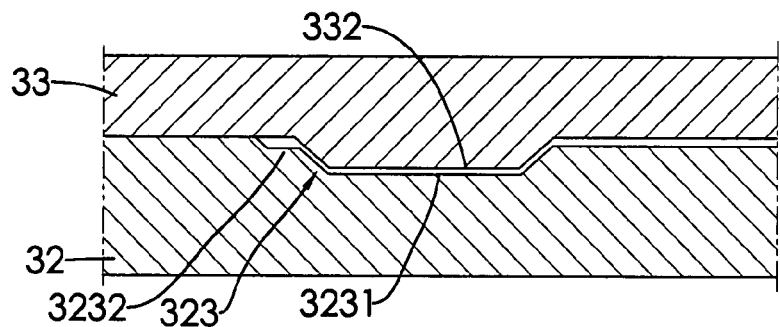
FIGS. 9 to 11 are enlarged operational cross-sectional views of the friction elements of the variable resistance hinge in FIG. 2.
Figure 10:
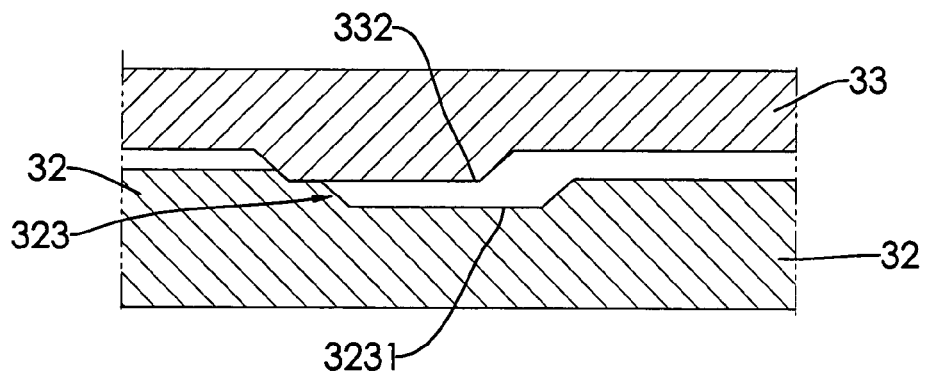
Figure 11:
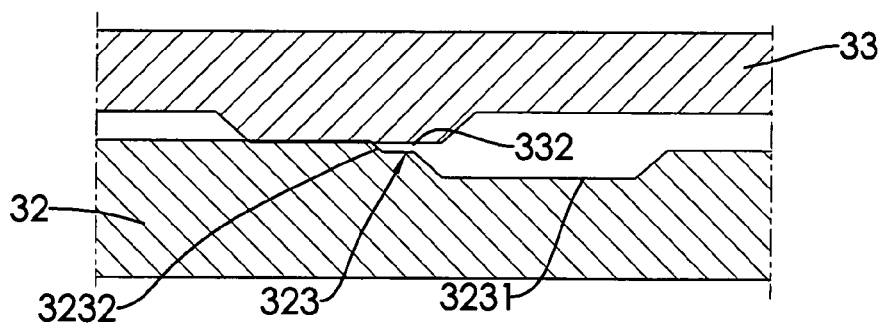

With further reference to FIGS. 6 and 7, the pivoting ring (32) is mounted rotatably around the shaft (11, 11A), is connected to the pivoting leaf (20), has an outer surface, a through hole (321) and at least one stepped detent (323) and may have a protruding stop (322).

The through hole (321) is formed axially through the pivoting ring (32) and is mounted rotatably around the shaft (11, 11A).

Each stepped detent (323) is an arc formed in the outer surface of the pivoting ring (32), concentric to the through hole (321) of the pivoting ring (32) and has a central recess (3231), at least one step recess (3232) and multiple gradient surfaces.

Each step recess (3232) is sequentially formed shallower than and adjacent to the central recess (3231), is parallel with the outer surface of the pivoting ring (32) and may be formed shallower than a previous step recess (3232).

The gradient surfaces graduate from the central recess (3231) to the at least one step recess (3232), graduate from the at least one step recess (3232) to the outer surface and may further obliquely connect two adjacent step recesses (3232). The adjacent gradient surfaces are separated by the at least one step recess (3232).

The protruding stop (322) is formed on and extends from the pivoting ring (32), is mounted in the stop mount (23) of the pivoting leaf (20) to securely attach the pivoting ring (32) to the pivoting leaf (20).

The stationary ring (33) is mounted around and engages the shaft (11, 11A), abuts and presses against the outer surface of the pivoting ring (32), has an inner surface, an outer surface, a keyed hole (331) and at least one friction protrusion (332) and may have at least one tab (333).

The keyed hole (331) is formed through the stationary ring (33), corresponds to and engages the shaft (11, 11A).

With further reference to FIGS. 8 to 11, each friction protrusion (332) is formed on and protrudes from the inner surface of the stationary ring (33), corresponds to and abuts the stepped detent (323) and may have two inclined surfaces. When the cover (80) is opened, the pivoting ring (32) rotates around the friction protrusion (332) causing the friction protrusion (332) to abut and travel along the gradient surfaces. Flowed by the step recesses (3232) thereby gradually increasing frictional resistance until the friction protrusion (332) is abutting the outer surface of the pivoting ring (32). When the cover (80) is fully opened, a maximum friction is provided. Therefore, the cover (80) is held shut by the central recess (3231) and is progressively harder to open until the cover (80) is held at a convenient angle, when the frictional resistance is greatest.

The at least one tab (333) is formed on and protrudes from the outer surface of the stationary ring (33).

The washer (31) is mounted securely around the shaft (11, 11A) between the pivoting leaf (20) and the pivoting ring (32).

The protecting washer (34) is mounted securely around the shaft (11, 11A), is attached securely to the outer surface of the stationary ring (33) and has at least one slot (341) and an outer surface.

The at least one slot (341) is formed in the protecting washer (34), corresponds to and engages the at least one tab (333).

The biasing element (35) comprises at least one resilient ring, is mounted rotatably around the shaft (11, 11A), abuts and presses against the outer surface of the protecting washer (34) and has an outer surface.

The friction washer (36) is mounted securely around the shaft (11, 11A) and abuts the outer surface of the biasing element (35).

The fastener (37) is mounted securely around the threaded segment (111) of the shaft (11, 11A) to mount the pressing assembly (30) on the shaft (11, 11A).

Consequently, with cooperation of the stepped detent (323) and the friction protrusion (332), the variable resistance hinge provides a variable resistance for pivoting movement of the cover (80) between opened and folded (the resistance is largest with the cover (80) being opened, smallest when being closed). Therefore, when closed, the biasing elements (35) are not under stress and lifespan of the biasing elements is increased. Moreover, since the frictional resistance progressively increases as the cover (80) is opened, the cover is easily separated from the base (90) and need not be pried open.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A variable resistance hinge comprising
    a stationary leaf having
        a proximal end;
        a distal end;
        an inner surface being formed perpendicularly on the distal end of the stationary leaf; and
        a shaft being formed on and extending coaxially from the distal end of the stationary leaf, being keyed and having
            a proximal end; and
            a distal end;
    a pivoting leaf being mounted rotatably on the shaft, abutting the inner surface of the stationary leaf and having
        a pivoting hole being formed coaxially through the pivoting leaf and being mounted rotatably around the shaft; and
        a mounting bracket being formed on and protruding from the pivoting leaf; and
    a pressing assembly being mounted around the shaft, pressing the pivoting leaf against the inner surface of the stationary leaf and having
        a pivoting ring being mounted rotatably around the shaft, being connected to the pivoting leaf and having
            an outer surface;
            a through hole being formed longitudinally through the pivoting ring and being mounted rotatably around the shaft; and
            at least one stepped detent being formed radially in the outer surface of the pivoting ring, concentric to the through hole of the pivoting ring and having
                a central recess;

at least one step recess being sequentially shallower than and adjacent to the central recess of the pivoting ring; and multiple gradient surfaces graduating from the central recess to the at least one step recess and then from the at least one step recess to the outer surface of the pivoting ring the gradient surfaces being separated by the at least one step recess; and a stationary ring being mounted around and engaging the shaft, abutting and pressing against the outer surface of the pivoting ring and having an inner surface;

an outer surface;

a keyed hole being formed through the stationary ring, corresponding to and engaging the shaft; and at least one friction protrusion being formed on and protruding from the inner surface of the stationary ring, corresponding to and abutting the stepped detent, selectively abutting the outer surface of the pivoting ring and selectively sliding along the gradient surfaces of the at least one stepped detent.

2. The variable resistance hinge as claimed in claim 1, wherein the shaft further has a friction cylinder being formed concentrically on the proximal end of the shaft;

the pivoting leaf further has a barrel being rotatably mounted tightly around the friction cylinder and having a neck;

a connecting protrusion being formed on and extending from the neck of the barrel and being attached securely to the mounting bracket of the pivoting leaf; and an opening being formed longitudinally in the barrel adjacent to the neck of the barrel and being disposed adjacent to the connecting protrusion.

3. The variable resistance hinge as claimed in claim 2, wherein the pivoting leaf further has a stop mount being formed in the pivoting leaf;

the pivoting ring further has a protruding stop being formed on and extending from the pivoting ring and being mounted in the stop mount of the pivoting leaf.

4. The variable resistance hinge as claimed in claim 3, wherein the shaft further has a threaded segment being formed on the distal end of the shaft;

the stationary ring further has at least one tab being formed on and protruding from the outer surface of the stationary ring;

the pressing assembly further has a washer being mounted securely around the shaft between the pivoting leaf and the pivoting ring;

a protecting washer being mounted securely around the shaft, being attached securely to the outer surface of the stationary ring and having an outer surface; and at least one slot being formed in the protecting washer and engaging a corresponding tab of the stationary ring;

a biasing element comprising at least one resilient ring, being mounted rotatably around the shaft, abutting and pressing against the outer surface of the protecting washer and having an outer surface;

a friction washer being mounted securely around the shaft and abutting the outer surface of the biasing element; and a fastener being mounted securely around the threaded segment of the shaft.

5. The variable resistance hinge as claimed in claim 4, wherein each friction protrusion has two inclined surfaces.

* * * * *